(12) United States Patent
Abernathy et al.

(10) Patent No.: US 7,653,848 B2
(45) Date of Patent: Jan. 26, 2010

(54) SELECTIVELY ENGAGING OPTIONAL DATA REDUCTION MECHANISMS FOR CAPTURING TRACE DATA

(75) Inventors: Christopher M. Abernathy, Austin, TX (US); Lydia M. Do, RTP, NC (US); Ronald P. Hall, Cedar Park, TX (US); Michael L. Karm, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 11/457,510

(22) Filed: Jul. 14, 2006

(65) Prior Publication Data
US 2008/0016407 A1   Jan. 17, 2008

(51) Int. Cl.
G01R 31/28 (2006.01)
G06F 11/00 (2006.01)
G06F 7/38 (2006.01)

(52) U.S. Cl. .......................... 714/724; 714/45; 712/227
(58) Field of Classification Search .................. 714/45, 714/724; 712/227
See application file for complete search history.

(56) References Cited

U.S. PATENT DOCUMENTS

| | | | |
|---|---|---|---|
| 4,574,351 A | | 3/1986 | Dang et al. |
| 4,821,178 A | * | 4/1989 | Levin et al. .................... 714/47 |
| 5,297,277 A | * | 3/1994 | Dein et al. ..................... 714/45 |
| 5,642,478 A | | 6/1997 | Chen et al. |
| 6,148,381 A | * | 11/2000 | Jotwani ....................... 711/158 |
| 6,233,673 B1 | * | 5/2001 | Higashida .................... 712/227 |
| 6,457,144 B1 | | 9/2002 | Eberhard |
| 6,467,083 B1 | * | 10/2002 | Yamashita ................... 717/128 |
| 6,542,855 B1 | * | 4/2003 | Pontius ........................ 702/186 |
| 6,813,732 B2 | * | 11/2004 | Kurooka et al. ............... 714/45 |
| 2005/0149309 A1 | * | 7/2005 | Nelson et al. .................. 703/14 |
| 2008/0016408 A1 | | 1/2008 | Abernathy et al. |

* cited by examiner

Primary Examiner—John J Tabone, Jr.
(74) Attorney, Agent, or Firm—Stephen R. Tkacs; Stephen J. Walder, Jr.; Matthew B. Talpis (57) ABSTRACT

An on-chip trace engine stores trace data in on-chip trace arrays and routes the trace data to output pins. An external trace capture device captures the trace data. The on-chip trace engine streams the trace data through the debug output pins at a slower rate that can be supported by external trace capture device. If compression is insufficient for the required data rate reduction, the on-chip trace engine includes selectable data reduction mechanisms. Responsive to an overflow condition, meaning trace data is captured in on-chip trace arrays faster than it can be routed off chip, the on-chip trace engine enters an overflow mode in which one or more of the data reduction mechanisms are selected. The data reduction mechanisms may include, for example, a data width reduction component, a pattern match data elimination component, a priority source select component, an under-sampling component, or various combinations thereof.

20 Claims, 5 Drawing Sheets

SELECTIVELY ENGAGING OPTIONAL DATA REDUCTION MECHANISMS FOR CAPTURING TRACE DATA

BACKGROUND

1. Technical Field

The present application relates generally to an improved data processing system and method. More specifically, the present application is directed to a system and method for streaming high frequency trace data off chip.

2. Description of Related Art

Chip debugging practices rely heavily on capturing signal state transitions in on-chip arrays, referred to as trace arrays, to understand the at-speed behavior of internal processor cores, bus interfaces, and various other components within a chip. Debug information captured in trace arrays can be used to identify logic design errors, timing failures, and performance bottlenecks. Runtime visibility of a large number of signals over an extended period of time enables a quick diagnosis of elusive problems. Successful trace systems provide significant signal visibility without incurring excessive costs of area, power, and complexity.

Typical on-chip trace architectures contain trace arrays that store data, multiplexer networks that select data, and control systems that control the manner in which data are captured. Such an architecture provides the ability to record a partial snapshot of chip behavior around the time of a failure to detect offending logic that does not function according to the needs of the system. A drawback of this architecture is the limited size of the sampling window due to constrained memory and chip input/output (I/O) resources.

Tradeoffs of cost, area, and power consumption may result in a design with relatively small trace arrays, which may not be sufficient for complete internal visibility into the design. Some solutions provide additional trace depth, such as sending trace data to main memory or routing trace data through chip output pins to an external storage device. Trace systems that use main memory for trace data storage exhibit significantly larger storage capacity; however, these systems are severely limited by multiple factors. The true trace memory depth is variably determined at runtime by how much main memory can be allocated to trace for a certain scenario. Dedicated external trace hardware, such as a logic analyzer, typically supports far greater capacities without compromising available resources on chip.

Another limitation of using main memory storage is the inherent interference experienced when trace data is recorded. The trace engine and system components, such as the processor bus interface, share a common data path to the memory system. Therefore, to record trace data, the processor must be stalled or the trace engine must steal available bus cycles. Both may alter the state of the system and, thus, corrupt the device under test (DUT).

Although chip output pins provide a conduit that would appear to solve the capacity problem, systems have not used this option to capture wide busses of at-speed data without discarding data. Lossless tracing through the chip output pins is not possible without some processing mechanism, because the functions that are being traced typically operate at clock frequencies much higher than can be supported by chip output pins. Common tracing solutions that rely on debug output pins discard samples of data and/or encode the data in a way that selectively discards information within a trace so that the data rate is sufficiently reduced to support the output pin bandwidth. These solutions do not provide lossless mechanisms to record and recover the complete trace.

One known solution for expanding the effective trace capture window using on-chip arrays is data compression, commonly using a lossless algorithm like run-length encoding (RLE). The main idea behind compression algorithms is a reduction in the amount of data stored in the array. For instance with RLE, this is done by only storing unique patterns to memory and a repeat count to indicate a number of consecutive duplicate samples. While this expands the ability of a trace array to capture more data over a larger period of time, it is still limited by the compressibility of the trace data and the array capacity when the data is exclusively stored in on-chip arrays.

SUMMARY

In one illustrative embodiment, a method of capturing high frequency trace data on chip comprises receiving trace data from at least one device under test on a chip. The trace data has a first data width. The method further comprises responsive to an overflow condition, setting an overflow mode. The method further comprises selectively engaging at least one data reduction mechanism to perform data reduction on the trace data according to the overflow mode to form reduced trace data. The method further comprises storing the reduced trace data in a trace array on the chip.

In another illustrative embodiment, a trace engine for capturing high frequency trace data on chip is provided. The trace engine comprises trace streaming control logic, a plurality of trace data receiving components configured to receive trace data from at least one device under test on a chip, at least one data reduction mechanism, and a trace array on the chip. Responsive to an overflow condition, the trace streaming control logic sets an overflow mode, selectively engages one or more of the at least one data reduction mechanism to perform data reduction on the trace data according to the overflow mode to form reduced trace data, and stores the reduced trace data in a trace array on the chip.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
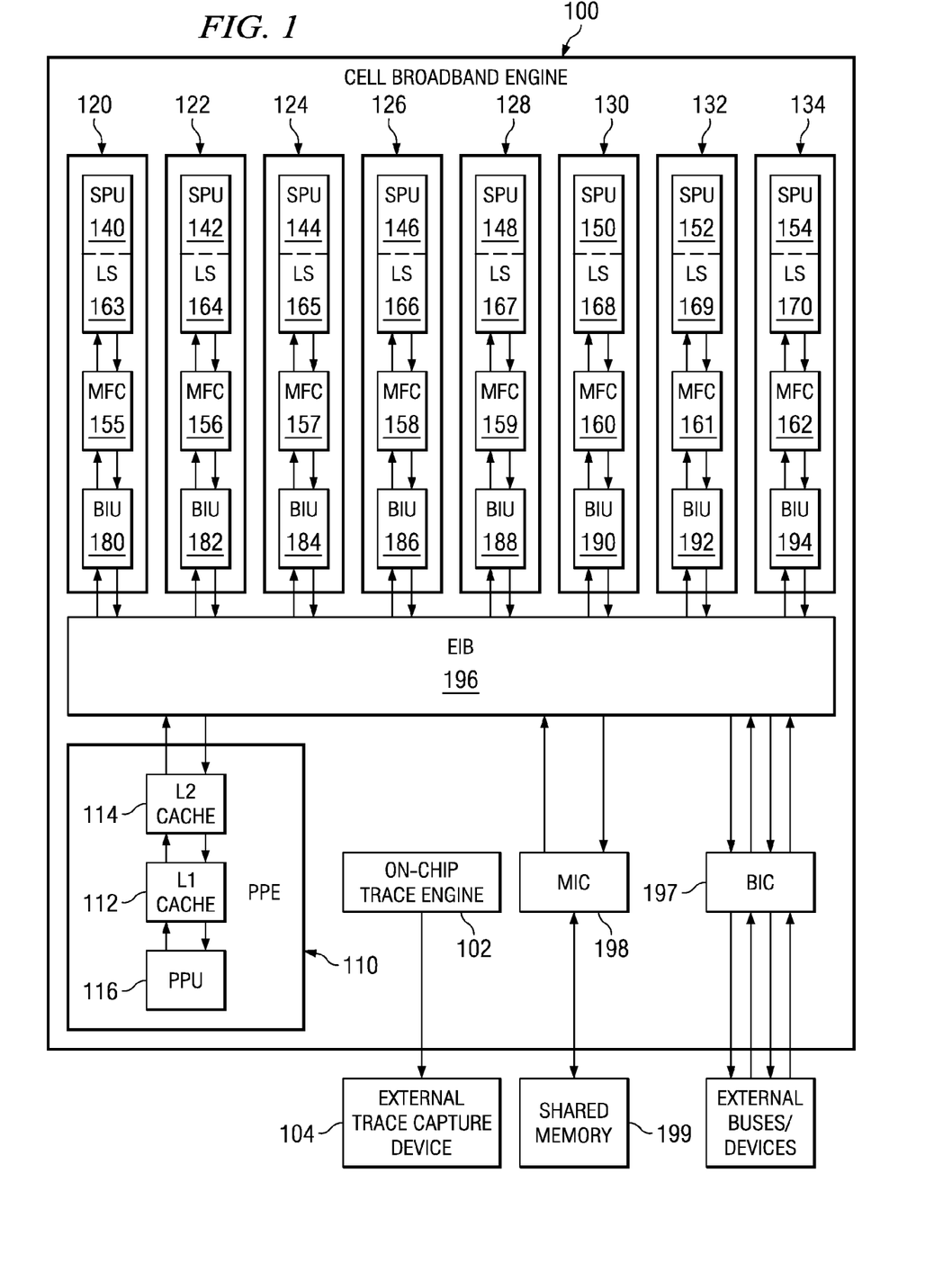
FIG. 1 is an exemplary block diagram of a data processing system in which aspects of the present invention may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high-bandwidth, internal element interconnect bus (EIB) 196, a bus interface controller (BIC) 197, and a memory interface controller (MIC) 198 are also provided.

The local memory or local store (LS) 163-170 is a non-coherent addressable portion of a large memory map, which physically may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory, which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

In accordance with an illustrative embodiment, CBE 100 includes on-chip trace engine 102 that stores trace data in on-chip trace arrays and routes the trace data through output pins to external trace capture device 104. On-chip trace engine 102 enables the storage and reconstruction of complete traces with the use of lossless compression to reduce the large amounts of high frequency data and streams the trace data through the debug output pins at a slower rate that can be supported by external trace capture device 104.

In accordance with a further illustrative embodiment, if compression is insufficient for the required data rate reduction, on-chip trace engine 102 includes selectable data reduction mechanisms. Responsive to an overflow condition, meaning trace data is captured in on-chip trace arrays faster than it can be routed off chip, on-chip trace engine 102 enters an overflow mode in which one or more of the data reduction mechanisms are selected. The data reduction mechanisms may include, for example, a data width reduction component, a pattern match data elimination component, a priority source select component, an under-sampling component, or various combinations thereof.

A person of ordinary skill in the art that the CBE is used in the description of the embodiments as an example of a processor design with which the on-chip trace engine 102 may be implemented. However, a person of ordinary skill in the art will recognize that on-chip trace engine 102 may be used in any processor design. In fact, the on-chip trace engine described herein may be implemented with any digital logic design with a plurality of devices under test from which trace data may be collected and streamed off-ship.

Figure 2:
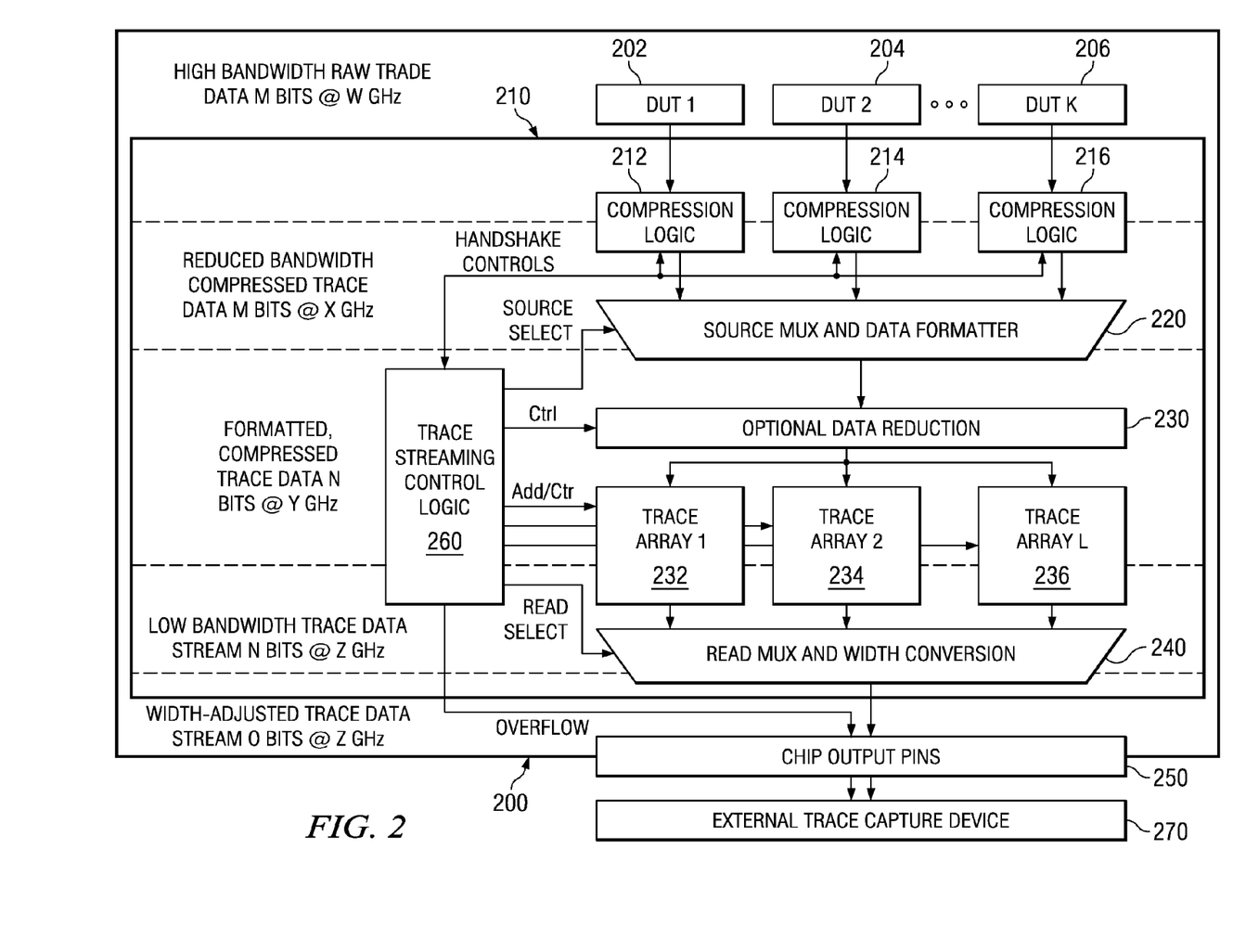
FIG. 2 illustrates a trace engine in accordance with an illustrative embodiment.

FIG. 2 illustrates a trace engine in accordance with an illustrative embodiment. Chip 200 includes devices under test (DUT) 202, 204, 206. DUTs may be any component within chip 200 for which trace data may be collected. For example, PPE 110, SPEs 120, 122, 124, 126, 128, 130, 132, 134, EIB 196, MIC 198, or BIC 197 in FIG. 1 may be devices under test; however, chip 200 may be any digital logic design, as stated above. Trace engine 210 receives trace data from devices under test 202, 204, 206 and streams the collected trace data off chip 200, through chip output pins 250, to external trace capture device 270. Chip 200 may include any number, K, of devices under test, depending upon the implementation. DUTs 1-K 202-206 communicate with trace engine 210 using communication lines that are separate from the system bus of chip 200.

Trace data are communicated so as to not affect performance of the DUTs. Trace busses are provided in addition to the required functional chip resources. They are designed to be non-intrusive, not considering the additional resources required to support the large busses. Each unit has hundreds of sources of trace data. Multiplexing within each unit allows the selection of 64 bits, which are sent to the trace unit. For the purpose of this disclosure, all units send a separate bus to the trace unit so that the trace unit can statically or dynamically select from which unit to accept trace data.

Within trace engine 210, any number, J, of compression logic components 212, 214, 216 receive trace data from DUTs 1-K 202-206. The number of compression logic components need not correspond to the number of DUTs. This raw trace data has a high bandwidth (M bits at W GHz). Compression logic components 1-J 212-216 may perform known compression algorithms to reduce the amount of data stored in any number, L, of trace arrays 232, 234, 236. One example of a known commonly compression algorithm is run-length encoding (RLE). According to the RLE algorithm, redundant traces are discarded and a subsequent trace includes a count of the discarded redundant traces. Compression logic components 212-216 reduce the bandwidth of the trace data, if possible, from M bits at W GHz to M bits @ X GHz where W>=X.

When data is available from a compression logic component, source multiplexer (MUX) and data formatter 220 reads trace data from a source, i.e. one of DUTs 202-206. Selection of the source may be statically determined at the beginning of the trace or may be dynamically switched if multiple source streaming is enabled, in which case source selection may be demand-based. Source MUX and data formatter 220 also aligns the data and marks it by source. Handshaking signals between compression logic components 212-216 and trace streaming control logic 260 determine when new compressed data are available. Each compression logic component 212-216 may have a small first-in/first-out (FIFO) buffer to buffer data while source MUX 220 is servicing another DUT.

The compressed trace data are temporarily stored in on-chip trace arrays 232-236. Optional data reduction mechanisms 230 may be used to reduce the amount of trace data if compression is insufficient, as will be described in further detail below. As a result of data formatter 220, and optionally data reduction mechanisms 230, the formatted and compressed trace data stored in trace arrays 1-L 232-236 may be reduced from M bits at X GHz to N bits at Y GHz, where M>=N and X>=Y. For example, trace data received from DUTs 202-206 may comprise 64-bit traces (M=64). If an overflow condition exists, optional data reduction mechanisms 230 may reduce the data width from 64 bits to 32 bits (N=32), discarding the least relevant data in the trace.

Trace arrays 1-L 232-236 are stored in memory arrays that are separate from system memory of chip 200. The size of trace arrays 1-L 232-236, as well as the number, L, may be scalable based on the needs of trace engine 210. New data are written to trace arrays 1-L 232-236 at locations addressed by a head pointer maintained by trace streaming control logic 260. As traces are written to trace arrays 1-L 232-236, trace streaming control logic 260 increments the head pointer. In one exemplary embodiment, if multiple trace arrays are implemented, i.e. L>0, the addressing scheme may seamlessly integrate the arrays by using upper address bits to determine the array and lower address bits to select a line in the array. Using multiple arrays provides a scalable buffer area capable of handling bursts of uncompressible data. Multiple arrays also provide interleaved memory access, if necessary, to maintain full speed tracing with slower on-chip arrays. Furthermore, multiple arrays provide flexibility to support various array technologies.

Read MUX and width conversion 240 reads trace data from trace arrays 1-L 232-236 using communications lines that are separate from the system bus of chip 200. Read MUX and width conversion 240 reads data from trace arrays 1-L 232-236 from locations addressed by a tail pointer maintained by trace streaming control logic 260. As traces are read from trace arrays 232-236, trace streaming control logic 260 increments the tail pointer. Presence of valid data in trace arrays 232-236 may be determined by a difference in the head pointer and the tail pointer. If the head pointer is equal to the tail pointer, then there is no valid trace data to be streamed off chip.

Read MUX and width conversion 240 may convert the data width from the stored width, N bits, to the output width, O bits, of chip output pins 250, where N does not equal O. For example, trace arrays 232-236 may store 64-bit trace data (N=64); however, chip output pins 250 may comprise only 16 output pins (O=16). In this example, read MUX and width conversion 240 steers the data from trace arrays 232-236 to output pins 240 sixteen bits at a time, to be reconstructed by external trace capture device 270.

Trace streaming control logic 260 sends an overflow indicator signal to output pins 250 to notify external trace capture device 270. The overflow indicator signal may indicate an overflow mode, which may include the optional data reduction mechanism(s) used, an under-sampling rate used, and the like.

The illustrative embodiment depicted in FIG. 2 provides a trace engine that stores trace data on-chip without using system memory or affecting the devices under test or the functional behavior of the chip. At the same time, the trace engine provides lossless compression, when possible, and still streams all collected trace data off chip to an external trace capture device. In addition, if lossless compression is not possible, the trace engine may engage one or more of a plurality of selectable data reduction mechanisms.

Figure 3:
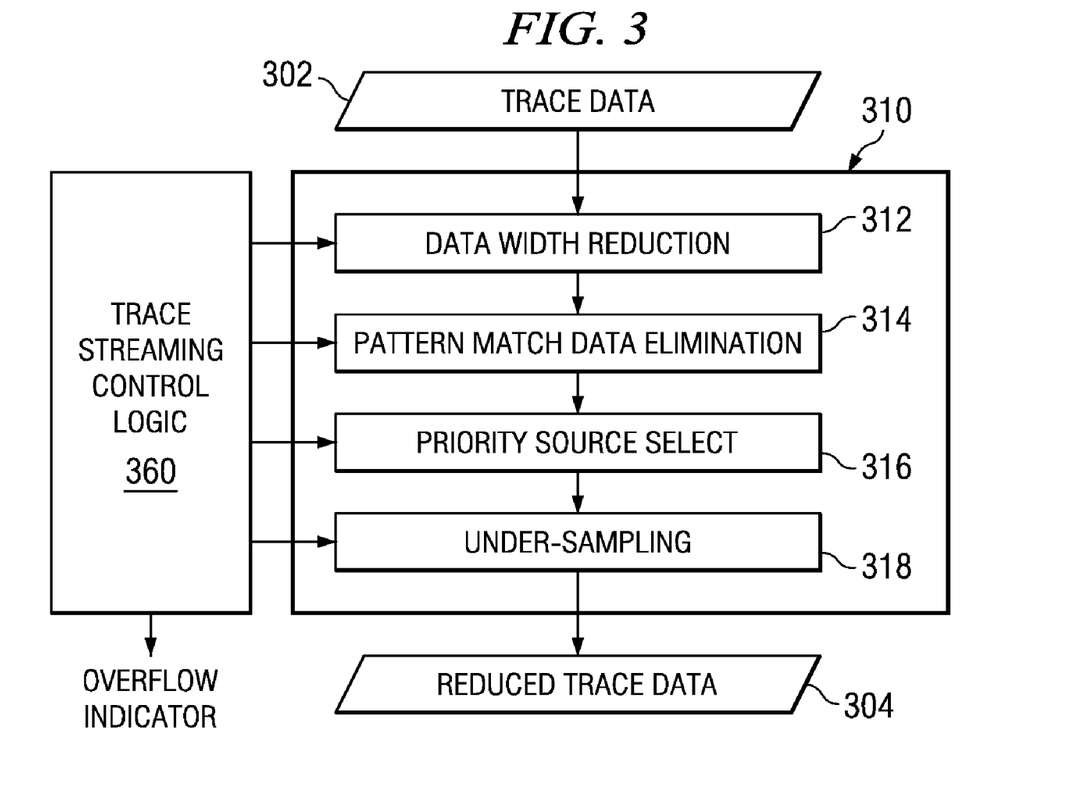
FIG. 3 depicts optional data reduction components in accordance with an illustrative embodiment.

FIG. 3 depicts optional data reduction components in accordance with an illustrative embodiment. Trace data 302 are collected from devices under test. Trace streaming control logic 360 selective engages one or more of optional data reduction components 310 in response to an overflow condition. However, a combination of the optional data reduction components may be used responsive to other conditions. For example, the combination of optional data reduction components may be user-configurable.

Data width reduction mechanism 312 reduces the original data width of trace data 302. Generally, data width reduction mechanism 312 discards data from the trace that are determined to be less relevant to the test. In other words, data width reduction mechanism 312 throws away the bits in which the external trace capture device is least likely to be interested. Discarded bit selection is programmable via configuration of trace streaming control logic 360.

Pattern matching data elimination mechanism 314 uses pattern-matching logic to monitor data according to a programmable mask. Only trace data that match the programmable mask are saved in the trace arrays. Traces that do not match the mask are discarded.

Priority select mechanism 316 stores trace data according to priority. Devices under test are prioritized according to configuration bits in trace streaming control logic 360. That is, trace streaming control logic 360 streams trace data from one DUT or several DUTs, interleaved according to programmable configuration bits. As an example, in FIG. 1, PPE 110 may have a higher priority than SPEs 120, 122, 124, 126, 128, 130, 132, 134. As trace data begin to saturate the streaming bandwidth limits of the output path, data from lower priority sources are discarded. If trace data from the higher priority sources continue to overflow the trace arrays, the priority threshold increases with trace data from more lower priority sources being discarded.

Under-sampling mechanism 318 periodically discards entire trace samples based on a predetermined under-sampling rate, which may be programmable within trace streaming control logic 360. The under-sampling rate may also dynamically increase if necessary.

Although shown as a separate component block in FIG. 2, optional data reduction mechanisms 312-318 may be embodied within various components within trace engine 210 or combinations thereof. For example, data width reduction mechanism 312 may be embodied within data formatter 220. Pattern match data elimination 314, priority source select mechanism 316, and under-sampling mechanism 318 may be implemented within compression logic 212.

As a result of data reduction mechanisms 310, reduced trace data 304 are stored in trace arrays with a decreased data width and/or a decreased data rate. For example, data reduction mechanisms 310 may simply reduce the width of trace data. On the other hand, data reduction mechanisms 310 may simply discard entire traces, thus reducing the data stream rate. Of course, trace streaming control logic 360 may employ a combination of data reduction algorithms if needed.

Trace streaming control logic 360 outputs an overflow indicator to the external capture device. The overflow indicator may include an indication of which data reduction mechanisms are used, if any. The overflow indicator may also indicate other information, such as the priority used by priority source select mechanism 316 or the under-sampling rate used by under-sampling mechanism 318.

However, there is a trade-off with including more overflow information in the overflow indicator, because the overflow indicator must be streamed with the trace data through the output pins. The more information that is included in the overflow indicator, the more of the output streaming bandwidth that is used for the overflow indicator itself. On the other hand, allowing for dynamically changing data width reduction masks, data elimination patterns, source selection priorities, and under-sampling rates allows for more control of data reduction and, thus, more control of the output streaming bandwidth. Therefore, the overflow indicator may vary from a simple overflow mode indicator to having more overflow information encoded in the overflow indicator depending upon the implementation.

Figure 4:
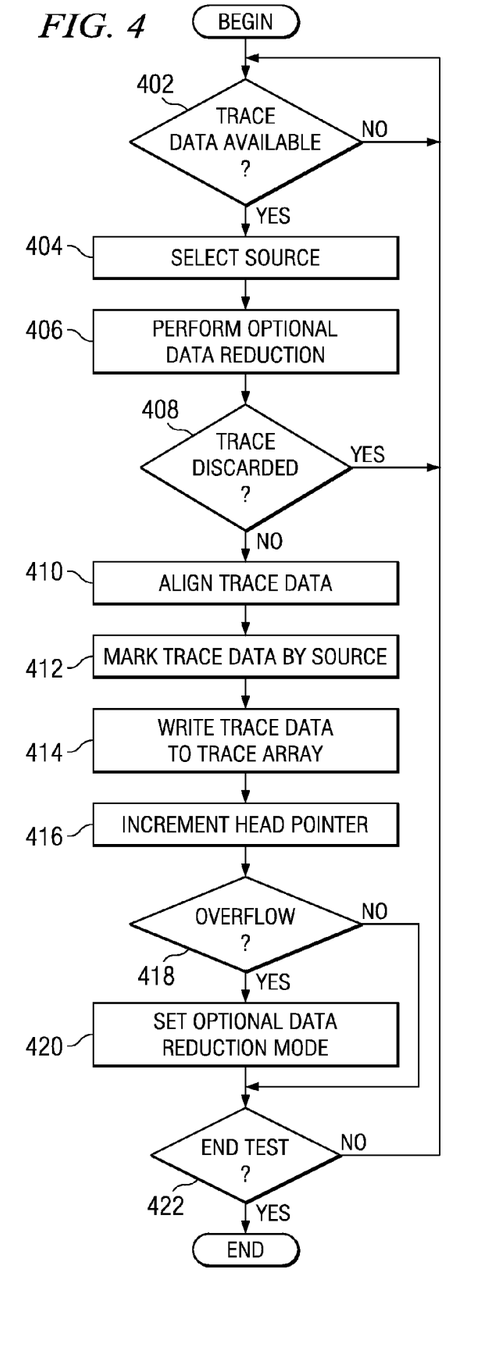
FIG. 4 is a flowchart illustrating operation of on-chip trace data collection within a trace engine in accordance with an illustrative embodiment.

FIG. 4 is a flowchart illustrating operation of on-chip trace data collection within a trace engine in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions, which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference to FIG. 4, operation begins and the trace engine determines whether trace data are available from devices under test (block 402). This determination may be made, for example, using handshaking signals between trace streaming control logic and compression logic components through which trace data passes from the device under test. Available trace data may be a full trace from a device under test or may be compression information resulting from repeated patterns of trace data. If trace data are not available, the trace engine repeats block 402 until trace data are available from a device under test.

If trace data are available in block 402, the trace engine selects a source (block 404). The source may be statically determined if a single device on the chip is being tested. However, if multiple sources are being tested on the device, the source may be dynamically determined based on demand or priority. Next, the trace engine performs optional data reduction (block 406).

Next, the trace engine determines whether the trace has been discarded (block 408). If the trace has been discarded, then operation returns to block 402 to determine whether new trace data are available. If the trace has not been discarded in block 408, then the trace engine aligns the trace data (block 410) and marks the trace data by source (block 412). The trace engine then writes the trace data to an on-chip trace array (block 414) and increments a head pointer (block 416).

Then, the trace engine determines whether an overflow condition occurs (block 418). An overflow condition may occur, for example, if the trace arrays on the chip are full, if the trace arrays are a predetermined percentage of being full, if a rate of writing to the trace arrays exceeds a rate of reading from the trace arrays by a predetermined threshold, or the like. If an overflow condition occurs, the trace engine sets optional data reduction mode signals to engage optional data reduction mechanisms (block 420).

The data reduction mode signals may engage optional data reduction mechanisms, such as overflow indicator, data width reduction, pattern matching data elimination, priority source selection, or under-sampling. In addition, or in alternative, setting optional data reduction mode signals in block 420 may comprise increasing a priority for priority source selection or increasing an under-sampling rate, for example. In an alternative embodiment, the overflow determination in block 418 may determine whether an overflow condition is no longer occurring, and setting the optional data reduction mode signals in block 420 may decrease priorities, decrease under-sampling rates, or deactivate optional data reduction mechanisms.

After setting optional data reduction mode signals in block 420, or if an overflow condition does not occur in block 418, the trace engine determines whether the end of the test, or trace, is reached (block 422). This determination may be made manually by an operator or may be made by another determination. For example, the trace may run until a particular instruction address is observed. If the end of the test is not reached, then operation returns to block 402 to determine whether new trace data are available. If the end of the test is reached in block 422, then operation ends.

Figure 5:
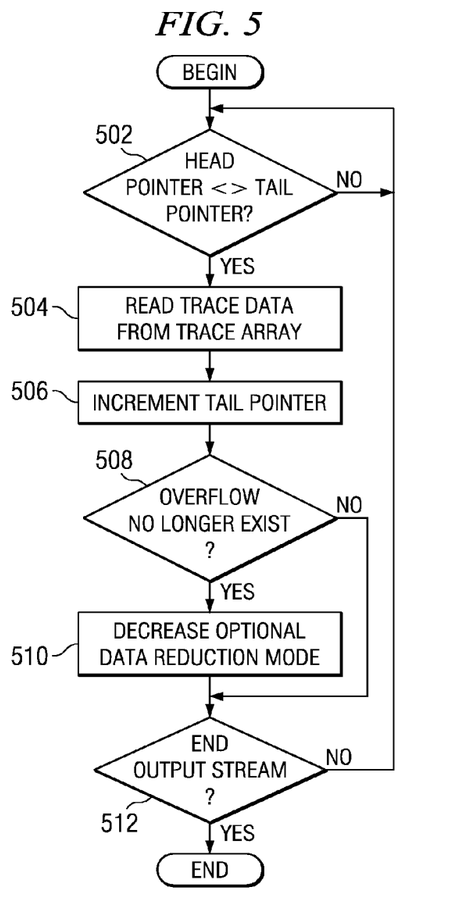
FIG. 5 is a flowchart illustrating operation of off-chip trace data streaming within a trace engine in accordance with an illustrative embodiment.

FIG. 5 is a flowchart illustrating operation of off-chip trace data streaming within a trace engine in accordance with an illustrative embodiment. The operation of the flowchart of FIG. 5 occurs concurrently with the operation of the flowchart of FIG. 4. That is, trace data are collected in on-chip trace arrays as they become available. At the same time, trace data are streamed to an off-chip trace capture device from the on-chip trace arrays whenever valid data are available in the trace arrays.

With particular reference to FIG. 5, operation begins and the trace engine determines whether trace data are available in the trace arrays by determining whether the head pointer is not equal to the tail pointer (block 502). If the head pointer is equal to the tail pointer, then the trace engine repeats block 502 until trace data are available.

If the head pointer is not equal to the tail pointer in block 502, then the trace engine reads trace data from the trace array (block 504) and increments the tail pointer (block 506). Reading the trace data may comprise converting the trace data to a data width of the output pins and steering the trace data to the output pins using a multiplexer.

Thereafter, the trace engine determines whether an overflow condition no longer exists (block 508). The trace engine may determine that the trace arrays are no longer near being full or a rate of writing to the trace arrays may no longer exceed a rate of reading from the trace arrays by a predetermined threshold. If the trace engine determines that an overflow condition no longer exists, or that the overflow condition has lessened, then the trace engine decreases an optional data reduction mode signal (block 510).

Thereafter, or if an overflow condition remains in block 508, the trace engine determines whether an end of the output stream is reached (block 512). This determination may be made manually by an operator or may be made by another determination. For example, the trace may run until a particular instruction address is observed. If an end of the output stream is not reached, operation returns to block 502 to determine whether trace data are available in the trace arrays. If an end of the output stream is reached in block 512, operation ends.

Figure 6:
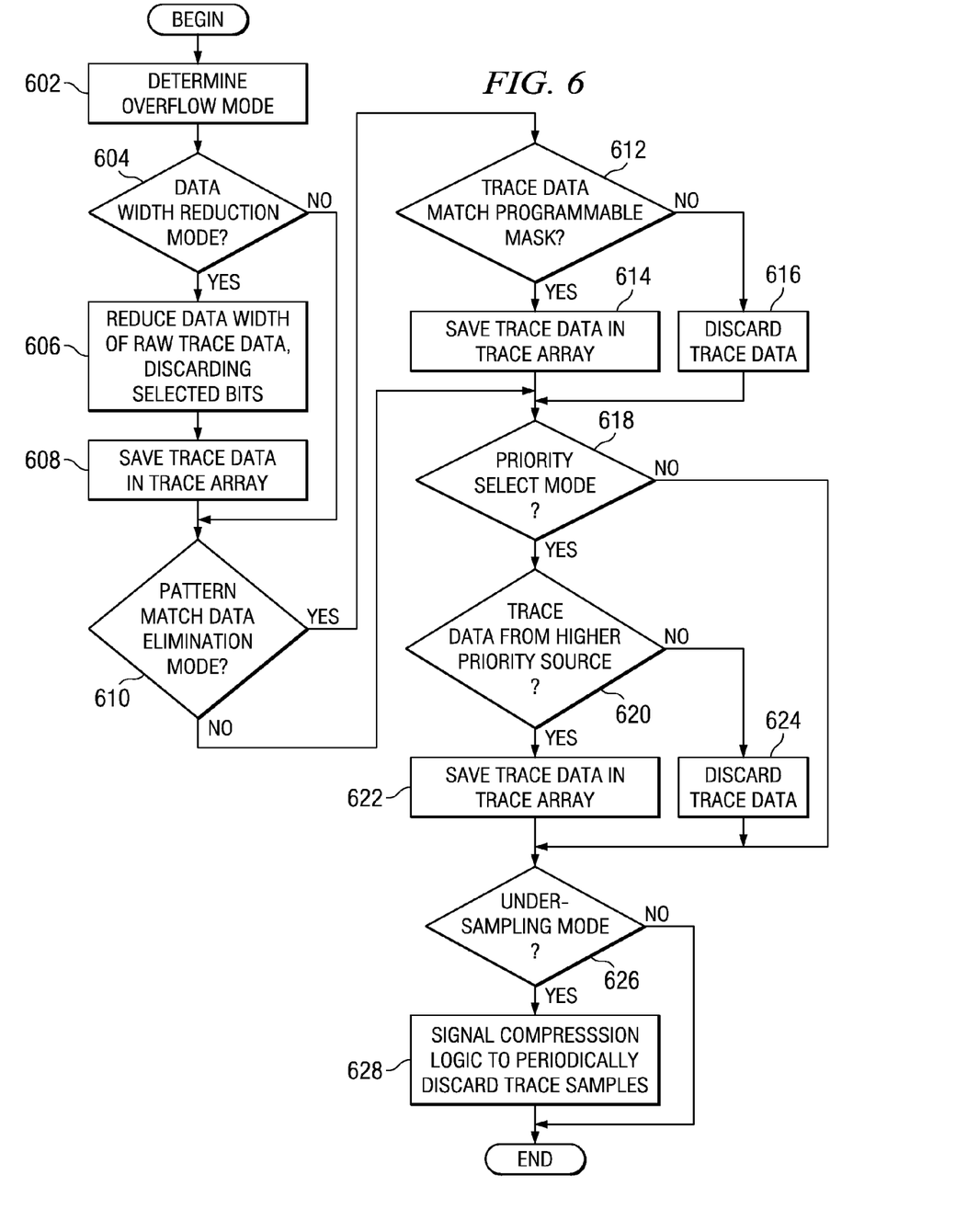
FIG. 6 is a flowchart illustrating operation of optional, selective data reduction within a trace engine in accordance with an illustrative embodiment.

FIG. 6 is a flowchart illustrating operation of optional, selective data reduction within a trace engine in accordance with an illustrative embodiment. Operation begins and the trace engine determines an overflow mode (block 602). The trace engine then determines whether the overflow mode indicates that a data width reduction mode is engaged (block 604). If the data width reduction mode is engaged, the trace engine reduces the data width of the raw trace data, discarding selected bits (block 606). Then, the trace engine saves the trace data in the trace array (block 608).

Thereafter, or if the overflow mode does not indicate a data width reduction mode is engaged in block 604, the trace engine determines whether the overflow mode indicates a pattern match data elimination mode is engaged (block 610). If the pattern match data elimination mode is engaged, the trace engine determines whether the trace data matches a programmable mask (block 612). If the trace data matches the programmable mask, the trace engine saves the data in a trace array (block 614); otherwise, the trace engine discards the trace data (block 616).

Thereafter, or if the overflow mode does not indicate a pattern match data elimination mode is engaged in block 610, the trace engine determines whether the overflow mode indicates a priority source select mode is engaged (block 618). If the priority source select mode is engaged, the trace engine determines whether the trace data is from a higher priority source (block 620). The trace engine may maintain a priority threshold for the priority source select mechanism. The trace engine may dynamically increase the priority threshold if the overflow condition does not improve or worsens, or may decrease the priority threshold if the overflow condition does improve. If the trace data is from a source with a priority higher than the threshold in block 620, the trace engine saves the trace data in a trace array (block 622); otherwise, the trace engine discards the trace data (block 624).

Thereafter, or if the overflow mode does not indicate a priority source select mode is engaged in block 618, the trace engine determines whether the overflow mode indicates an under-sampling mode is engaged (block 626). If the under-sampling mode is engaged, the trace engine signals the compression logic to periodically discard trace samples according to a predetermined under-sampling rate configured within the trace engine (block 628). The trace engine may dynamically adjust the under-sampling rate according to whether the overflow condition improves or worsens. Thereafter, or if the overflow mode does not indicate an under-sampling mode is engaged in block 626, operation ends.

A person of ordinary skill in the art will appreciate that the optional data reduction components may be applied in any order. In addition, optional data reduction components may be applied responsive to conditions other than overflow. For instance, the optional data reduction components may be applied, in various combinations, based on user-selectable configuration options.

Thus, the illustrative embodiments solve the disadvantages of the prior art by providing an on-chip trace engine that stores trace data in on-chip trace arrays and routes the trace data to output pins. An external trace capture device captures the trace data. The on-chip trace engine enables the storage and reconstruction of complete traces with the use of lossless compression to reduce the large amounts of high frequency data. The on-chip trace engine streams the trace data through the debug output pins at a slower rate that can be supported by external trace capture device. The on-chip trace engine provides a system that supports the capture of high-frequency transitions of an entire debug test case, rather than partial snapshots. Furthermore, the on-chip trace engine provides a non-intrusive data capture system that does not rely on functional paths to store data off-chip.

If compression is insufficient for the required data rate reduction, the on-chip trace engine includes selectable data reduction mechanisms. Responsive to an overflow condition, meaning trace data is captured in on-chip trace arrays faster than it can be routed off chip, the on-chip trace engine enters an overflow mode in which one or more of the data reduction mechanisms are selected. The data reduction mechanisms may include, for example, a data width reduction component, a pattern match data elimination component, a priority source select component, an under-sampling component, or various combinations thereof.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of capturing high frequency trace data on chip, the method comprising:
    receiving trace data from at least one device under test on a chip;
    responsive to an overflow condition, setting an overflow mode;
    selectively engaging at least one data reduction mechanism from a plurality of data reduction mechanisms to perform data reduction on the trace data according to the overflow mode to form reduced trace data; and
    storing the reduced trace data in a trace array on the chip.

2. The method of claim 1, wherein the plurality of data reduction mechanisms comprise a data width reduction mechanism, a pattern match data elimination mechanism, a priority source select mechanism, and an under-sampling mechanism.

3. The method of claim 1, further comprising:
    streaming trace data from the trace array to output pins on the chip; and
    providing an overflow indicator to the output pins.

4. The method of claim 3, wherein the overflow indicator indicates a priority level or an under-sampling rate.

5. The method of claim 3, wherein streaming trace data from the trace array on the chip comprises:
    reading trace data from a target array according to a tail pointer; and
    incrementing the tail pointer.

6. The method of claim 1, wherein receiving trace data from at least one device under test comprises:
    compressing trace data received from a given device under test within the at least one device under test to discard redundant traces; and
    counting a number of discarded redundant traces.

7. The method of claim 1, wherein the at least one device under test comprises a plurality of devices under test and wherein receiving trace data from at least one device under test comprises:
    selecting a source device under test from the plurality of devices under test; and
    marking trace data from the source device under test by source.

8. The method of claim 1, wherein storing the reduced trace data in a trace array comprises:
    addressing a target trace array within a plurality of trace arrays and a target line of the target trace array; and
    writing the reduced trace data to the target trace array at the target line of the target trace array.

9. The method of claim 1, wherein storing the reduced trace data in a trace array comprises:
    writing the reduced trace data to a target array according to a head pointer; and
    incrementing the head pointer.

10. The method of claim 1, wherein the trace array is a target trace array within a plurality of on-chip trace arrays.

11. A trace engine for capturing high frequency trace data on chip, the trace engine comprising:
    trace streaming control logic;
    a plurality of trace data receiving components configured to receive trace data from at least one device under test on a chip;
    a plurality of data reduction mechanisms; and
    a trace array on the chip,
    wherein responsive to an overflow condition, the trace streaming control logic sets an overflow mode, selectively engages one or more of the plurality of data reduction mechanisms to perform data reduction on the trace data according to the overflow mode to form reduced trace data, and stores the reduced trace data in the trace array on the chip.

12. The trace engine of claim 11, wherein the plurality of data reduction mechanisms comprise a data width reduction mechanism, a pattern match data elimination mechanism, a priority source select mechanism, and an under-sampling mechanism.

13. The trace engine of claim 11, further comprising:
    a read multiplexer, under control of the trace streaming control logic, configured to stream trace data from the trace array to output pins on the chip and provide an overflow indicator to the output pins.

14. The trace engine of claim 13, wherein the overflow indicator indicates a priority level or an under-sampling rate.

15. The trace engine of claim 13, wherein the read multiplexer reads trace data from a target array according to a tail pointer and increments the tail pointer.

16. The trace engine of claim 11, wherein the plurality of trace data receiving components are further configured to compress trace data received from a given device under test within the at least one device under test to discard redundant traces and counting a number of discarded redundant traces.

17. The trace engine of claim 11, wherein the at least one device under test comprises a plurality of devices under test, the trace engine further comprising:

a data formatter component configured to select a source device under test from the plurality of devices under test and mark trace data from the source device under test by source.

18. The trace engine of claim 11, wherein the trace streaming control logic is configured to store the reduced trace data in a trace array by addressing a target trace array within a plurality of trace arrays and a target line of the target trace array and write the reduced trace data to the target trace array at the target line of the target trace array.

19. The trace engine of claim 11, wherein the trace streaming control logic is configured to write the reduced trace data to a target array according to a head pointer and increment the head pointer.

20. The trace engine of claim 11, wherein the trace array is a target trace array within a plurality of on-chip trace arrays.

* * * * *